United States Patent [19]

Braybrook

[11] 4,422,231

[45] Dec. 27, 1983

[54] METHOD OF FORMING A BLOCK FOR A METAL BELT

[75] Inventor: Kenneth A. Braybrook, Letchworth, England

[73] Assignee: Borg-Warner Corporation, Chicago, Ill.

[21] Appl. No.: 349,806

[22] Filed: Feb. 18, 1982

Related U.S. Application Data

[62] Division of Ser. No. 167,261, Jul. 9, 1980, abandoned.

[51] Int. Cl.³ ................. B21D 39/00; B23P 11/00
[52] U.S. Cl. .................................. 29/509; 29/513
[58] Field of Search ............ 474/201, 242, 272; 29/509, 513

[56] References Cited

U.S. PATENT DOCUMENTS 4,080,841  3/1978  Vollers ........................ 474/201
4,193,312  3/1980  Cicognani ..................... 474/242

Primary Examiner—Howard N. Goldberg
Assistant Examiner—Steven E. Nichols
Attorney, Agent, or Firm—Aubrey L. Burgess

[57] ABSTRACT

A power transmission belt especially adapted for use in variable pulley transmissions and comprising a continuous metal containing band with attached drive blocks. The drive blocks are formed from sheet metal stampings and formed by sheet metal bending procedures.

4 Claims, 4 Drawing Figures

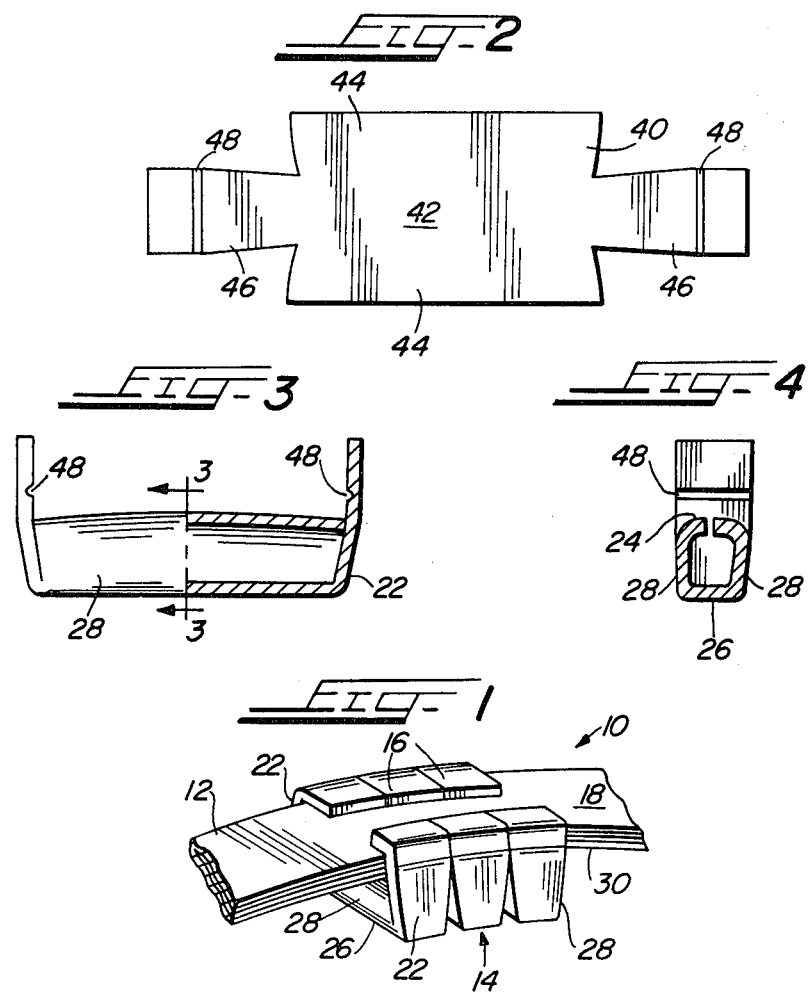

METHOD OF FORMING A BLOCK FOR A METAL BELT

This is a division of application Ser. No. 167,261 filed July 9, 1980, now abandoned.

BACKGROUND OF THE INVENTION

Flexible power transmission belts comprising an assembly of a plurality of superimposed steel strips and a plurality of V-shaped solid metal blocks are well known in the art. An example of such a construction is disclosed in U.S. Pat. No. 3,720,113 granted Mar. 13, 1973 to H. J. Van Doorne et al. In the patented structure, the blocks are provided with lateral guides having relatively short top edges which overlie the steel strips to maintain the parts in assembled relationship. The precise method used to assemble the blocks on the steel strip is not disclosed.

Another example of a flexible power transmission belt is described in U.S. Pat. No. 3,949,621 granted Apr. 13, 1976 to Beusink, deceased, et al in which solid metal plates are mounted on metal strips, the strips being received in slots in the lateral edges of the plates.

Other flexible power transmission belts comprising an assembly of links, pins and pulley contact members are described in U.S. Pat. Nos. 2,038,583, granted Apr. 28, 1936 to Maurer and 2,475,264, granted July 5, 1949 to Sutton.

THE INVENTION

The invention to be described relates to a method for making a flexible power transmission belt and to the belt so made. The belt comprises a continuous metal band with metal drive blocks attached thereto, the drive blocks having angled sides to engage the flanges of drive and driven pulleys. Such a belt is especially adapted for use in variable pulley transmissions.

In the belt of this invention, each block is formed of sheet metal from a blank. Generally cross-shaped blanks are stamped from sheet metal, the blanks each having a central body portion, extending side portions and extending end portions. The side portions are folded by sheet metal working techniques to form a hollow central member and the end portions are bent to close the hollow ends of the central member and extend upwardly of the top thereof. The extending portions of the end members are bent over the metal band. These steps are repeated for each drive block, which are adjacent to one another over the length of the band. The front and backs of each drive block are tapered to permit articulation of the assembly; the angled end surfaces can be roughened or otherwise treated to enhance friction contact with pulley flanges. Also, the blocks can be hardened after most of the forming steps but before the end portions are bent over the band. To facilitate the bending, a narrow strip on each end portion is softened after the general hardening steps.

The belts manufactured according to this invention are relatively inexpensive and lighter in weight than solid blocks.

THE DRAWING

FIG. 1 is a partial perspective view of a belt according to this invention;

FIG. 2 is a plan view of a stamped sheet metal blank from which a drive block is formed;

FIG. 3 is a side view of a partially completed drive block; and

FIG. 4 is a sectional view of line 4—4 of FIG. 3.

DETAILED DESCRIPTION

Attention is invited to FIG. 1 of the drawing which illustrates a portion of a power transmission belt 10 comprising a metal band 12 and a plurality of side-by-side drive blocks 14. The metal band 12 is preferably a plurality of relatively thin strips connected together; it could be a solid metal strip or a single metal strip wound to have multiple layers. Each of the drive blocks 14 are connected to the band 12 by ears 16 which partly traverse the upper surface 18 of the band 12. A hollow body portion 20 of the drive blocks comprises ends 22 which are tapered to contact the flanges of a pulley and upper, lower and side parts 24, 26 and 28, respectively (see also FIGS. 3 and 4). The upper part 24 is located adjacent to the lower surface 30 of the band 12 while the side parts 28 taper in such a manner to permit articulation of the belt 10. In that the drive blocks are hollow and made from sheet metal by stamping and forming techniques, they are relatively light and inexpensive to manufacture.

To manufacture the drive blocks 14, as illustrated in FIG. 2, blanks 40 are stamped from sheet metal. Each blank 40 is generally cross-shaped having a central body portion 42, side portions 44 and end portions 46. Preferably, grooves or notches 48 are formed in the end portions to facilitate the bending thereof over the band 12.

The side portions 44 and end portions 46 are bent by conventional metal working techniques to form the intermediate formed blocks as illustrated in FIGS. 3 and 4. The faces 22 of the end portions can be ground or roughened to enhance frictional contact with the pulleys of the drive system, and the intermediate formed blocks are then hardened in a conventional manner. To facilitate bending the end portions over the band 12, the area around the grooves or notches are softened, also in a conventional manner. After the area is softened, the end portions are bent over the band 12 to form the ears 16 as previously described.

I claim:

1. In a method for constructing a power transmission drive belt, especially adaptable for use in transmissions having variable pulleys, having a continuous metal-containing band with upper and lower surfaces and drive blocks connected thereto, each drive block having side surfaces adapted to frictionally engage the flanges of said pulleys of said transmission; the improvement which comprises the steps:
   (a) providing a plurality of essentially cross-shaped blanks each having a body with extending side and end portions;
   (b) bending said sideportions of each blank to form a hollow central member having an upper surface and a lower surface;
   (c) bending said end portions of each blank to extend upwardly of said upper surface;
   (d) assembling each so formed blank with its upper surface in juxtaposition to the lower surface of said band and its end portions extending above the upper surface of said band; and
   (e) bending said end positions extending above the upper surface of said band over said band.

2. In a method as recited in claim 1, further comprising providing a notch in each of said end portions to facilitate their bending over said band.

3. In a method as recited in claim 1, further comprising hardening said blanks after bending said side end portions to form a hollow-central member with closed ends.

4. In a method as recited in claim 3, further comprising providing a notch in each of said end portions to facilitate their bending over said band and softening said notches after hardening said blanks to further facilitate the bend of said end portions over said band.

* * * * *